US006961214B2

(12) United States Patent
Ameen et al.

(10) Patent No.: US 6,961,214 B2
(45) Date of Patent: Nov. 1, 2005

(54) REFINEMENT OF SPINDLE MOTOR BEARING GAP

(75) Inventors: Mohammad Mahbubul Ameen, Campbell, CA (US); Raquib Uddin Khan, Pleasanton, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 128 days.

(21) Appl. No.: 10/458,500

(22) Filed: Jun. 10, 2003

(65) Prior Publication Data

US 2004/0120072 A1 Jun. 24, 2004

Related U.S. Application Data

(60) Provisional application No. 60/435,673, filed on Dec. 19, 2002.

(51) Int. Cl.[7] .................................................. G11B 17/02

(52) U.S. Cl. ...................................................... 360/99.08

(58) Field of Search ............................ 360/99.08, 98.07, 360/97.02; 384/446, 473, 478

(56) References Cited

U.S. PATENT DOCUMENTS 5,940,246 A * 8/1999 Khan et al. .............. 360/99.08

* cited by examiner

*Primary Examiner*—David Davis
(74) *Attorney, Agent, or Firm*—Wax Law Group

(57) ABSTRACT

A method and system is provided for achieving good dynamic performance and negligible wear to spindle motor components. In an aspect, a disc drive storage system is provided having a hydro bearing surface coating for meeting bearing gap tolerance design specifications. In an aspect, the surface coating is a non-reactive coating of diamond like carbon (DLC), applied with physical vapor deposition (PVD). In an aspect, the surface coating nullifies any taper of an opposing surface coating. In an aspect, the hydro bearing, with an applied coating, defines a uniform gap between 0.5 microns and 6 microns.

28 Claims, 6 Drawing Sheets

REFINEMENT OF SPINDLE MOTOR BEARING GAP

CROSS REFERENCE TO RELATED APPLICATION

This application is based on provisional application Ser. No. 60/435,673, filed Dec. 19, 2002, entitled A Novel Approach To Adjust Bearing Gap In Sputter Coated Parts Of Spindle Motors In Disk Drives Application, and assigned to the assignee of this application and incorporated herein by reference.

FIELD OF THE INVENTION

The invention relates generally to spindle motors, and more particularly to refinement of hydrodynamic bearing assemblies that provide support and rotation for spindle components in disc drive data storage systems.

BACKGROUND OF THE INVENTION

The use of disc drive systems are currently moving beyond computers into other devices including digital cameras, digital video recorders (DVR), laser printers, photo copiers and personal music players. Disc drive memory systems are used for storage of digital information that can be recorded on concentric tracks of a magnetic disc medium. Several discs are rotatably mounted on a spindle, and the information, which can be stored in the form of magnetic transitions within the discs, is accessed using read/write heads or transducers. The read/write heads are located on a pivoting arm that moves radially over the surface of the disc. The read/write heads must be accurately aligned with the storage tracks on the disc to ensure the proper reading and writing of information.

Discs are rotated at high speeds during operation using an electric motor located inside a hub or below the discs. One type of motor is known as an in-hub or in-spindle motor, which typically has a spindle mounted by means of a bearing system to a motor shaft disposed in the center of the hub. One of the bearings is located near the top of the spindle and the other near the bottom. The bearings permit rotational movement between the shaft and the hub, while maintaining alignment of the spindle to the shaft.

In a hydrodynamic bearing system, a lubricating fluid (gas or liquid) serves as the media to create pressure between a stationary base or housing and a rotating spindle or rotating hub. The dimensions of the gap between the rotating component and the stationary component of the motor must be tightly controlled to obtain good dynamic performance. The dynamic performance of a hydrodynamic motor is a function of the gap since gap pressure affects dynamic performance, and hydrodynamic and hydrostatic bearings utilize pressures. That is, a hydrodynamic bearing is a self-pumping bearing that generates a pressure internally to maintain a fluid film separation. A hydrostatic bearing requires an external pressurized fluid source to maintain the fluid separation.

Metal sections of the hydro bearing system are machined, making it difficult to obtain a gap with uniform or specified dimensions in a repeatable fashion and resulting in variations in the manufacturing process. The tight control required to produce small dimensions of the gap (in some applications 2 or 3 microns between the adjacent surfaces of a stationary shaft and rotating sleeve) makes precision machining bearing components difficult and costly. Precision machining is especially expensive when utilized to create a uniform surface on both a shaft and a sleeve. A bearing gap, in particular sections, should remain uniform and constant. When the bearing gap varies, nonrepetitive runout (NRRO), as well as other bearing performances are effected. Coating the bearing gap surfaces (i.e. shaft or sleeve surface) using a conventional sputtering process is unsatisfactory and inadequate since a coating thickness variation, a taper, and a variable bearing gap results. Further, there is a trend to decrease the aspect ratio (depth to width ratio) in sleeves. Moreover, there is a trend to evermore decrease bearing clearances to achieve greater recording densities. Additionally, gap variations may be specified in design, making the manufacturing process even more difficult.

Furthermore, it has become essential to select suitable material pairs that ensure negligible wear during operation of the motor. This is especially true in the case of mobile applications that must be shock-resistant, under both operating and non-operating conditions, and where precision parts are essential and gap tolerance is tight.

SUMMARY OF THE INVENTION

The present invention provides a system and process to provide and maintain precision parts in spindle motors. A tight and uniform bearing gap within a specified tolerance is provided in a repeatable process, and thus good dynamic performance is achieved. Further, the present invention provides a system and process to maintain negligible wear to motor components. The improved bearing gap can be utilized in spindle motors in disk drive applications.

In an embodiment of the present invention, features of the invention are achieved by coating spindle motor parts using a sputtering system, such as physical vapor deposition (PVD). A non-reactive hard coating of carbon or diamond-like carbon (DLC) is applied to one or both of the contacting surfaces. In one example, the contacting surfaces include a shaft and a sleeve. DLC is sputtered onto the shaft from one area of the spindle motor, followed by sputtering onto the sleeve from an area opposite of the motor. A tapered coating on the shaft substantially nullifies a tapered coating on the sleeve. In an embodiment of the present invention, the sputtering system uses the same process parameters for both the male and female parts (i.e. shaft and sleeve) during coating operations. In another embodiment, the thickness gradient of the coating is adjusted by varying the aspect ratio of the female bearing part (i.e. sleeve).

In an embodiment, the present invention overcomes the difficult and expensive task of achieving a uniform gap, conventionally attempted by precision machining adjacent bearing gap components, including shaft and sleeve surfaces. For example, when precision machining is utilized on a male surface (and results in a machined taper), the present invention provides a method of coating the adjacent and associated female surface with a tapered coating, such that any gap variation is nullified. In another embodiment of the present invention, a coating is applied to both male and female surfaces. By employing a coating, good dynamic performance and negligible wear is achieved to motor components, namely the shaft and sleeve.

Further, in an embodiment, protection is provided against outgassing of motor components and a neutral or non-reactive surface is created that does not promote corrosion, caused by the selection of motor components from free machining steels.

Other features and advantages of this invention will be apparent to a person of skill in the art who studies the invention disclosure. Therefore, the scope of the invention will be better understood by reference to an example of an embodiment, given with respect to the following figures.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE INVENTION

Exemplary embodiments are described with reference to specific configurations. Those of ordinary skill in the art will appreciate that various changes and modifications can be made while remaining within the scope of the appended claims. Additionally, well-known elements, devices, components, methods, process steps and the like may not be set forth in detail in order to avoid obscuring the invention.

Figure 1:
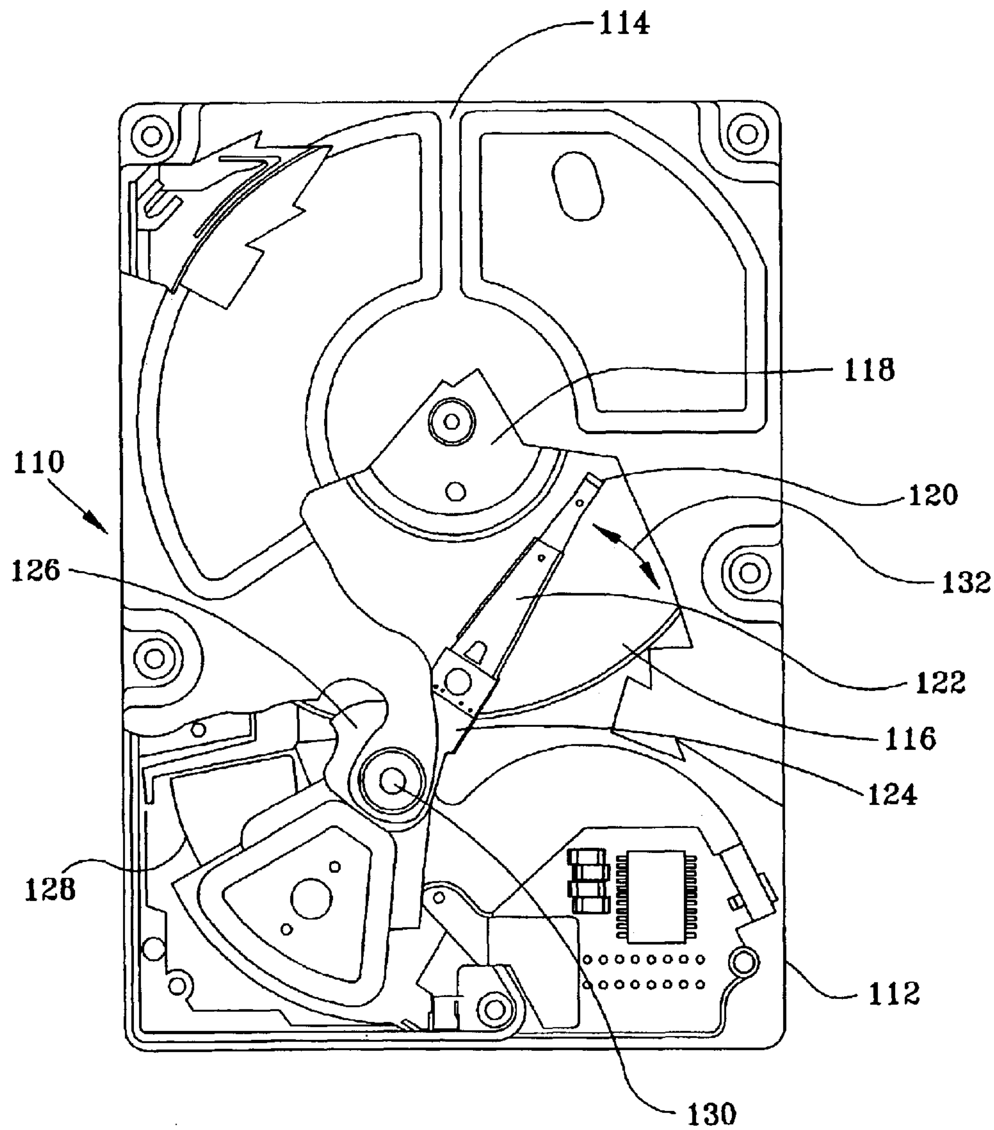
FIG. 1 is a top plain view of a disc drive data storage system in which the present invention is useful.

A system and method for refinement of hydrodynamic bearing assemblies that provide support and rotation for spindle components is described herein. Referring to the drawings wherein identical reference numerals denote the same elements throughout the various views, FIG. 1 illustrates a typical disc drive data storage device 110 in which the present invention is useful. Disc drive 110 includes housing base 112 that is combined with top cover 114 to form a sealed environment.

Disc drive 110 further includes disc pack 116, which is mounted for rotation on a spindle motor (not shown) by disc clamp 118. Disc pack 116 includes a plurality of individual discs, which are mounted for co-rotation about a central axis. Each disc surface has an associated head 120 (read head and write head), which is mounted to disc drive 110 for communicating with the disc surface. In the example shown in FIG. 1, heads 120 are supported by flexures 122, which are in turn attached to head mounting arms 124 of actuator body 126. The actuator shown in FIG. 1 is of the type known as a rotary moving coil actuator and includes a voice coil motor (VCM), shown generally at 128. Voice coil motor 128 rotates actuator body 126 with its attached heads 120 about pivot shaft 130 to position heads 120 over a desired data track along arcuate path 132. This allows heads 120 to read and write magnetically encoded information on the surfaces of discs 116 at selected locations.

In the example discussed below, the use of a hydrodynamic bearing is shown in conjunction with a spindle motor. Clearly, the present invention is not limited to use with this particular design of a disc drive, which is shown only for purposes of the example. Further, it is to be understood that the present invention is useful with a wide variety of motors, especially those using fluid dynamic bearings.

Figure 2:
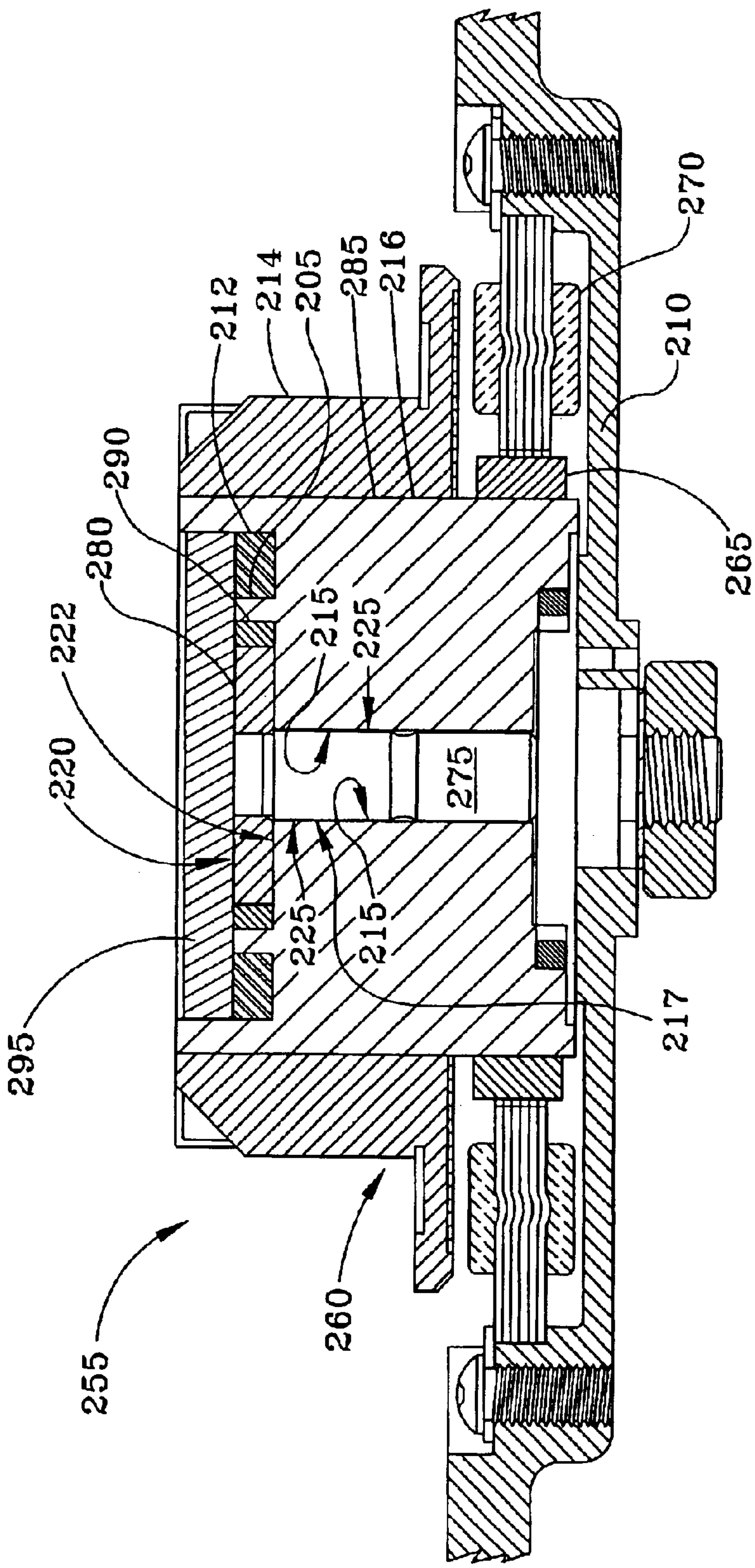
FIG. 2 is a sectional side view of a hydrodynamic bearing spindle motor, utilized in an embodiment of the present invention.

FIG. 2 is a sectional side view of a hydrodynamic bearing spindle motor 255 used in disc drives 110 in which the present invention is useful. Typically, spindle motor 255 includes a stationary component and a rotatable component. The stationary component includes shaft 275 that is fixed and attached to base 210. The rotatable component includes hub 260 having one or more magnets 265 attached to a periphery thereof The magnets 265 interact with a stator winding 270 attached to the base 210 to cause the hub 260 to rotate. Core 216 is formed of a magnetic material and acts as a back-iron for magnets 265. Magnet 265 can be formed as a unitary, annular ring or can be formed of a plurality of individual magnets that are spaced about the periphery of hub 260. Magnet 265 is magnetized to form one or more magnetic poles.

The hub 260 is supported on a shaft 275 having a thrustplate 280 on one end. The thrustplate 280 can be an integral part of the shaft 275, or it can be a separate piece which is attached to the shaft, for example, by a press fit. The shaft 275 and the thrustplate 280 fit into a sleeve 285 and a thrustplate cavity 290 in the hub 260. A counter plate 295 is provided above thrustplate 280 resting on an annular ring 205 that extends from the hub 260. Counterplate 295 provides axial stability for the hydrodynamic bearing and positions hub 260 within spindle motor 255. An O-ring 212 is provided between counterplate 295 and hub 260 to seal the hydrodynamic bearing and to prevent hydrodynamic fluid from escaping.

Hub 260 includes a central core 216 and a disc carrier member 214, which supports disc pack 116 (shown in FIG. 1) for rotation about shaft 275. Disc pack 116 is held on disc carrier member 214 by disc clamp 118 (also shown in FIG. 1). Hub 260 is interconnected with shaft 275 through hydrodynamic bearing 217 for rotation about shaft 275. Bearing 217 includes radial surfaces 215 and 225 and axial surfaces 220 and 222.

A fluid, such as lubricating oil or a ferromagnetic fluid fills interfacial regions between the shaft 275 and the sleeve 285, and between the thrustplate 280 and the thrustplate cavity 290 and the counter plate 295. Although the present figure is described herein with a lubricating fluid, those skilled in the art will appreciate that a lubricating gas can be used.

In order to promote the flow of fluid over the bearing surfaces which are defined between the thrust plate 280 and the counterplate 295; between the thrust plate 280 and the sleeve 285; and between the shaft 275 and the sleeve 285, typically one of the two opposing surfaces of each such assembly carries sections of pressure generating grooves (not shown). The effective operation of the pressure generating grooves depends in part on the bearing gap being within a specified tolerance. The present invention as described herein provides a method of coating to achieve such a specified bearing gap tolerance.

It is to be appreciated that spindle motor 255 can employ a fixed shaft as shown in FIG. 2, or a rotating shaft. In a rotating shaft spindle motor, the bearing is located between the rotating shaft and an outer stationary sleeve that is coaxial with the rotating shaft.

In an embodiment, a method is provided for applying a carbon or diamond like carbon (DLC) coating to at least one contacting bearing surface. As described herein, a carbon coating is to be understood as a graphite form or a diamond form. In practice, a carbon coating is a mixture of graphite and diamond. Also, as described herein, carbon is to be understood as a larger quantity of graphite than diamond, and DLC is to be understood as a larger quantity of diamond than graphite. Further, it is to be appreciated that other materials can be used for the coatings described herein, including a chromium coating.

A suitable pair is selected (i.e. a shaft and sleeve, or hub and cone). In an embodiment, one precision machined surface is selected and a counter surface is coated. Alternatively, both surfaces are coated (i.e. the shaft and sleeve are coated). The entire contacting bearing surface or a predetermined portion of the surface is coated. The method of applying a coating to the shaft or sleeve include directing a carbon or DLC coating by processes including physical vapor deposition (PVD) and direct current (DC) sputtering. It is to be appreciated that other known processes can be utilized to apply the coating as described herein.

Physical vapor deposition (PVD) methods are clean, dry vacuum deposition methods in which a coating is deposited over an entire object simultaneously, rather than in localized areas. In PVD processes, a workpiece is subjected to plasma bombardment. PVD methods differ in the means for producing metal vapor and the details of plasma creation. Primary PVD methods include ion plating, ion implantation, sputtering, and laser surface alloying. In an embodiment, the present invention utilizes PVD.

Figure 3:
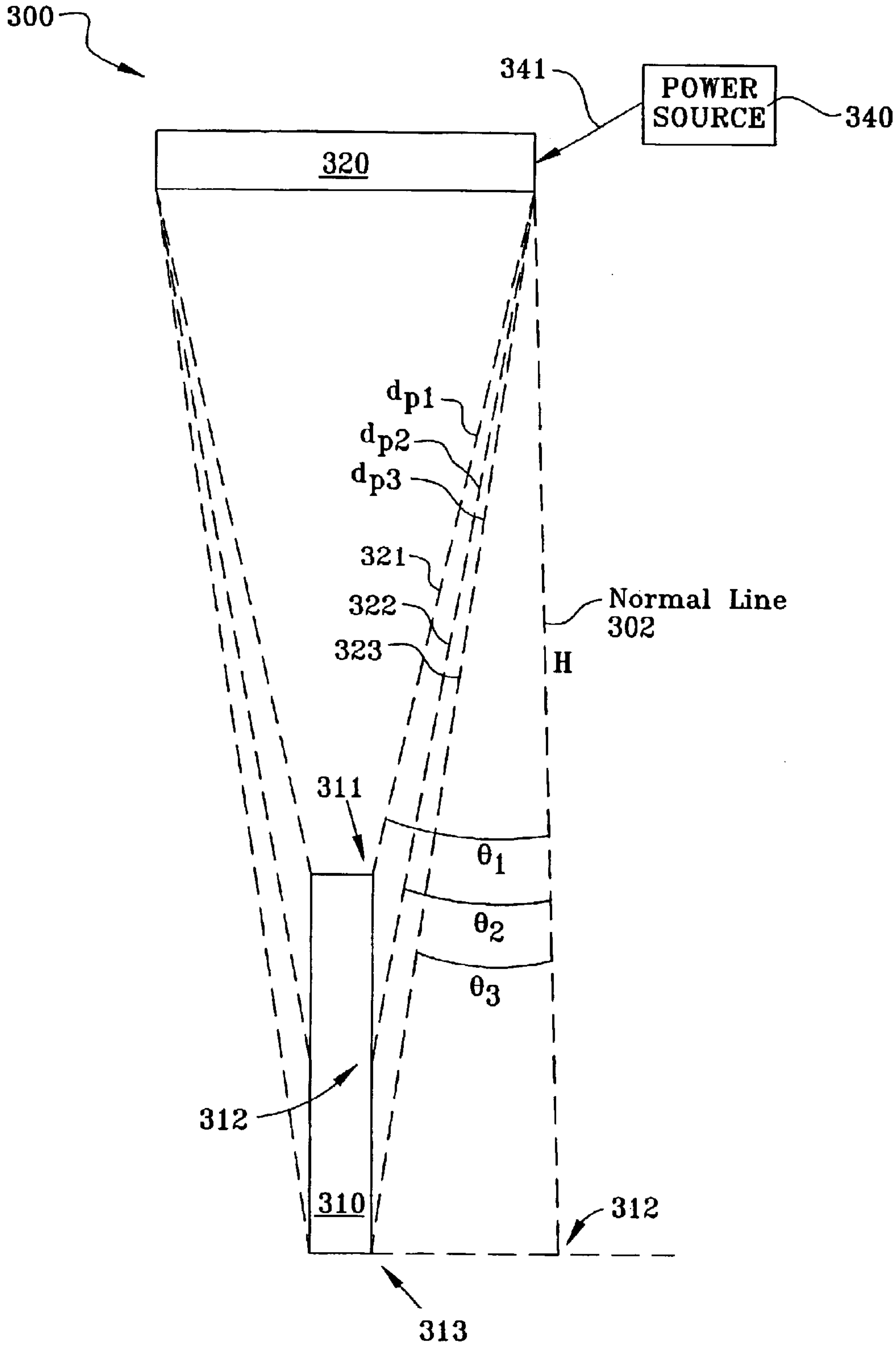
FIG. 3 is a cross sectional view of a conventional sputtering system, utilized in an embodiment of the present invention.

Referring to FIG. 3, a cross sectional view of a conventional sputter system 300 is illustrated that can be utilized in the present invention to coat a bearing surface. A substrate is shown at 310. A central surface portion of the substrate is designated as 312. Respective upper and lower portions of the substrate surface are designated 311 and 313. A hypothetical point-source target 320 is positioned symmetrically above substrate 310. The distance between the point-source target 320 and the substrate seating 312 defines a height, H. A power source 340 (not drawn to scale) is coupled by way of means 341 to the point-source target 320.

The emission trajectories of the target particles from target 320 are uniformly distributed about three dimensional space. Three such trajectories are illustrated by way of dashed lines and respectively referenced as 321, 322 and 323. While the emission trajectories are shown drawn originating from one area of target 320 and integrated on substrate 310, it is to be understood that, in practice, emissions come from all areas of target 320 and each emission area of target 320 is integrated over all areas of substrate 310. Further, target 320 is equal or larger in size as compared with substrate 310 to maintain coating uniformity (having a taper) on substrate 310. Trajectory 321 has a particle travel distance of $d_{p1}$ and carries particles from target 320 to the upper surface region 311 of the substrate 310. Trajectory 322 has a travel distance of $d_{p2}$ and carries target particles from the target 320 to the central surface region 312. Trajectory 323 has a particle travel distance of $d_{p3}$ and carries target particles from the target 320 to the lower surface region 313.

Each of the trajectories 321, 322 and 323 defines an angle of θ between itself and the normal line 302 (the hypothetical perpendicular drawn line). The film deposition rate (r) in sputtering systems is inversely proportional to the particle travel distance. Thus, the deposition rate of the bottom trajectory 323 is less than that of the top trajectory 321 and the central trajectory 322. Further, the step coverage uniformity is improved if the maximum trajectory angle θ (or "angle of attack" θ as it is referred) is reduced. However, as the particle travel distance is reduced, the trajectory angle θ is increased. The particle travel distance and the trajectory angle θ are counterposed attributes. A tapered coating results on substrate 310 wherein upper surface region 311 receives a thicker coating than central surface region 312 and lower surface region 313. Lower surface region 313 receives the thinnest coating. In an embodiment, the present invention utilizes this process to obtain a desired tapered coating, as discussed below.

The contribution received at each substrate surface point, from each target-source is summed to determine the accumulated deposition at each receiving point on the substrate surface. The specific dimensions of the target width, the substrate width and the target-to-substrate separation distance H must be known in order to determine the cumulative deposition rate at each receiving point on the substrate surface.

Figure 4A:
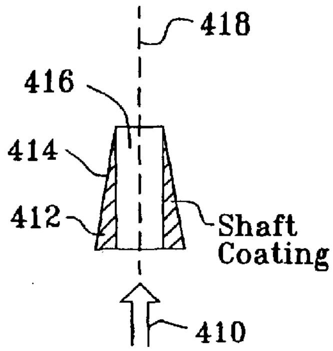
FIG. 4A is a cross sectional view of carbon/DLC coating on a shaft, in accordance with an embodiment of the present invention.

As an example of application of a carbon/DLC coating in the present invention, FIG. 4A illustrates the direction of application of carbon/DLC from a target to shaft 416. Arrow 410 is to be interpreted as pointing from a base to a top cover (base and top cover are not shown). Arrow 410 represents the particle travel direction of application from the target to shaft 416.

In the case of coating a shaft using a PVD process, a coating thickness variation results in z-axis 410 along the length of shaft 416, such that a varying bearing gap results. The z-axis 410 runs up and down a shaft, from a base to a top cover. The coating thickness variation in z-axis 410 of shaft 414 is a consequence of the variation in the particle travel distance and deposition rate between the target and shaft position (as discussed above with respect to FIG. 3). As an illustration of coating variation, coating thickness 412 is shown thicker than coating thickness 414. It is to be understood that coating thickness 412 and 414 are the same coating and are separately labeled to point out the difference in thickness.

The coating variation in z-axis 410 is nullified by separately coating shaft 416 and sleeve 426 (or a shaft and a hub assembly). The PVD process results in shaft 416 and sleeve 426 having a thickness variation in the z-axis. Therefore, in an embodiment, by designing a thickness variation in shaft 416, the variation in sleeve 426 is nullified and a bearing gap within a tolerance range is achieved.

Figure 4B:
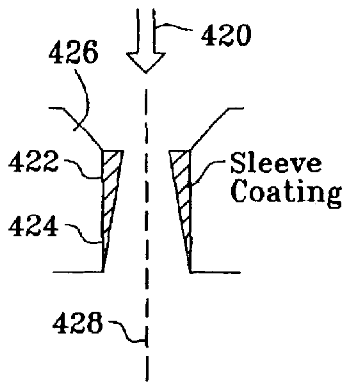
FIG. 4B is a cross sectional view of carbon/DLC coating on a sleeve, in accordance with an embodiment of the present invention.

FIG. 4B illustrates a direction of application of DLC from a target to sleeve 426. Arrow 420 is to be interpreted as pointing in a direction that is 180 degrees with respect to the direction of arrow 410 (FIG. 4A). Arrow 420 points from a top cover to a base (top cover and base are not shown). Arrow 420 represents the particle travel direction of application from the target to sleeve 426.

As arrows 410 and 420 illustrate, coating 422 and 424 are applied from opposing directions with respect to coating 412 and 414, such that the tapered z-axis 428 of coating 422 and 424 nullifies the tapered z-axis 418 of coating 412 and 414. Also, it is to be understood that coating 422 and 424 are the same coating and are separately labeled to identify the difference in thickness.

Figure 4C:
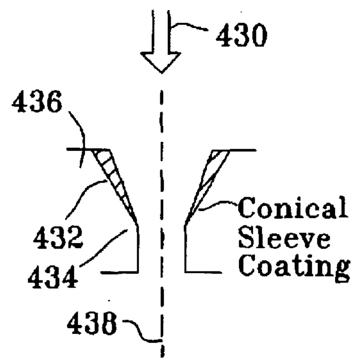
FIG. 4C is a cross sectional view of carbon/DLC coating on a conical sleeve, in accordance with an embodiment of the present invention.

FIG. 4C illustrates a conical sleeve in which the present invention is useful. In the case of a conical sleeve, PVD sputtering 430 results in a smaller grade taper, as compared with a non-conical sleeve. As illustrated, coating thickness 432 of conical sleeve 436 is thicker than coating thickness 434, similar to a non-conical sleeve. However, the taper in z-axis 438 is less than the taper of a non-conical sleeve. Nevertheless, since gap tolerances are so small (some gaps being 0.5 microns), the process of the present invention is useful in the case of conical sleeves. Further, the design of conical sleeves can require a smaller gap tolerance, as compared with non-conical sleeves, making the present invention further useful.

Figure 5:
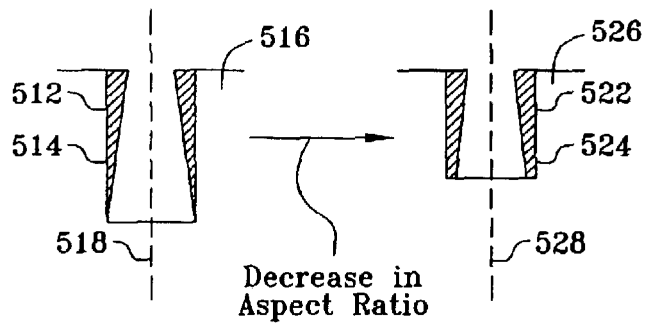
FIG. 5 is a cross sectional view of a sleeve illustrating the relationship between a taper variation and decrease in aspect ratio, in accordance with an embodiment of the present invention.

FIG. 5 illustrates two coated sleeves, sleeve 516 having a smaller aspect ratio (depth to width) as compared to sleeve 526. That is, the difference in taper gradient of coating 512 and coating 514 (along z-axis 518) is greater than the taper gradient of coating 522 and coating 524 (along z-axis 528). Sleeve 526, having a smaller aspect ratio, presents a smaller grade taper, which is characteristic of PVD sputtering process.

In an embodiment, the thickness gradient of a coating is adjusted by varying the aspect ratio of the female bearing part (i.e. sleeve). Further, since gap tolerance designs are so small, conventional gaps being a couple microns or less, the present invention is useful in the case of sleeves having smaller aspect ratios. It is to be understood that the present invention would similarly be useful in the case of shafts having smaller aspect ratios.

Figure 6:
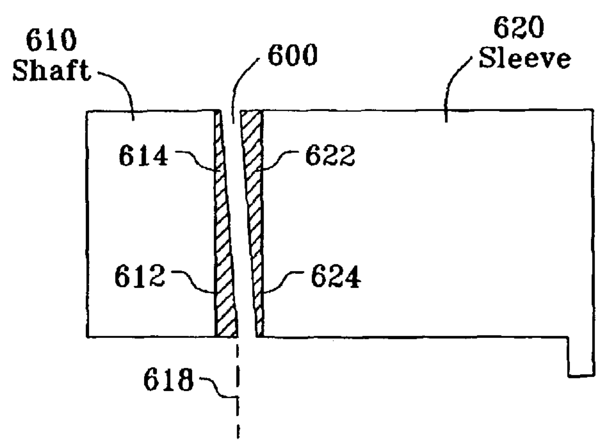
FIG. 6 is a cross sectional view of a shaft and sleeve illustrating a nullified tapered coating, in accordance with an embodiment of the present invention.

Referring to FIG. 6, the result of an embodiment of the process of coating described herein is illustrated. Shaft 610 is positioned adjacent to sleeve 620 with an illustration of tapered coating 612 and 614 offsetting or nullifying tapered coating 622 and 624 along z-axis 618, such that gap 600 satisfies the gap tolerance design specification.

It is to be understood that coating 612 and 614 are the same coating and are separately labeled to identify the difference in thickness. Similarly, it is to be understood that coating 622 and 624 are the same coating and are separately labeled to identify the difference in thickness. Further, in an embodiment, the coating thickness is between 0.1 microns at its thinnest point and 5.0 microns at its thickest point. As to be appreciated, the coating thickness is dependent on the application.

By meeting the gap tolerance design specification, utilizing an embodiment of the present invention, good dynamic performance and no wear or negligible wear to motor components is achieved, which significantly enhances the motor life. The motor components include shaft 610 and sleeve 620. In one embodiment, one of shaft 610 and sleeve 620 is a rotatable component. In another embodiment, one of shaft 610 and sleeve 620 is a stationary component.

As used herein, the term gap means the distance from the surface of the rotating component to the adjacent surface of the stationary component. For example, the term gap can mean the distance between the inner surface of a sleeve and the outer surface of a shaft. As in shown FIG. 6, gap 600 extends from outer surface of shaft 610 to the adjacent inner surface of sleeve 620. When a coating is applied to a surface (or surfaces), the gap width would include the thickness of the coating.

The gap is measured during running conditions when the adjacent surfaces are not touching (i.e. the shaft and sleeve adjacent surfaces). In an embodiment, the gap is a uniform distance between 0.5 microns and 6 microns. In another embodiment, the gap is a uniform distance less than 0.5 microns. It is important for reasons including dynamic performance that a gap is substantially uniform, i.e., maximum and minimum width tolerances must be maintained. In an embodiment, the gap has a tolerance of within 10% of the designed gap. For example, if the gap is designed to be 2 microns, then the tolerance is 0.2 microns, making the allowable gap 1.8 to 2.2 microns. The gap design may call for a variable gap. In an embodiment, a variable gap between 0.5 microns and 6 microns is provided.

The following figures are provided as an example of results of an embodiment of the present invention, in regard to dynamic performance and wear. The examples are provided for illustrative purposes and are not intended to be limiting.

Figure 7:
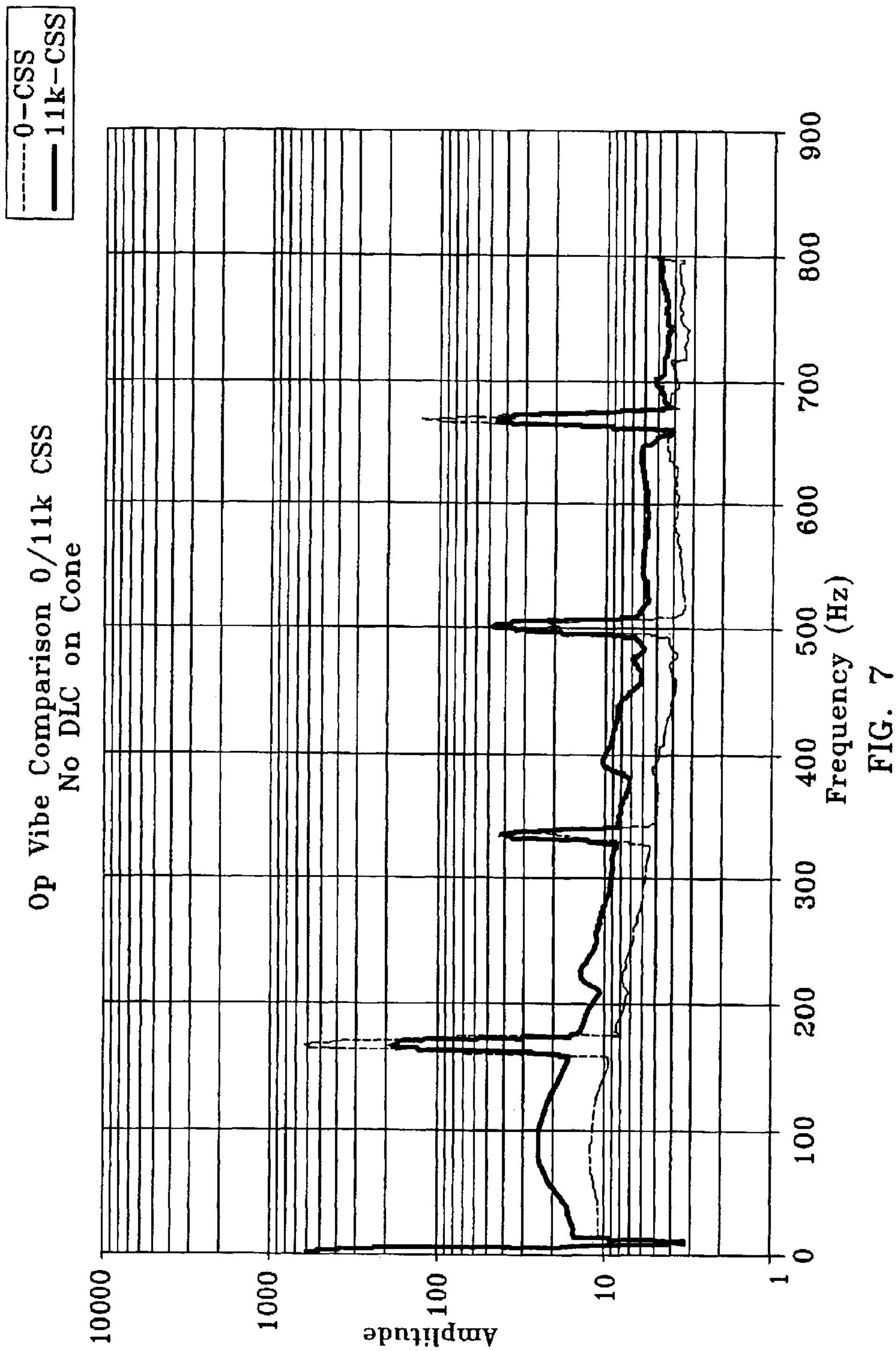
FIG. 7 is a graphical illustration of dynamic performance degrade without a coating, as described herein.

FIG. 7 shows a graphical representation of an operational vibration comparison of a contact stop/start (CSS) in which a DLC coating is not utilized on a stationary component or a rotational component. Measurements of amplitude and frequency were taken at zero CSS (thin dotted line) and at 11,000 CSS (thick solid line). As can be observed in comparing the 0 CSS line with the 11,000 CSS line, dynamic performance degrades when a DLC coating is not utilized on a bearing surface.

In operation, and as referred to herein, a typical CSS commences when a data transducing head begins to slide against the surface of the disk as the disk begins to rotate. Upon reaching a predetermined high rotational speed, the head floats in air at a predetermined distance from the surface of the disk where it is maintained during reading and recording operations. Upon terminating operation of the disk drive, the head again begins to slide against the surface of the disk and eventually stops in contact with and pressing against the disk. Each time the head and disk assembly is driven, the sliding surface of the head repeats the cyclic operation consisting of stopping, sliding against the surface of the disk, floating in the air, sliding against the surface of the disk and stopping.

The present invention is useful, in part, to minimize or prevent any effects that CSS might have on bearing surfaces. That is, when the head is in contact with the disk, the bearing surfaces are similarly in contact, for example, the shaft and sleeve surfaces. Wear can result when the bearing surfaces are in contact, and the coating provided in the present invention ensures negligible wear or no wear on the contacting bearing surfaces.

Figure 8:
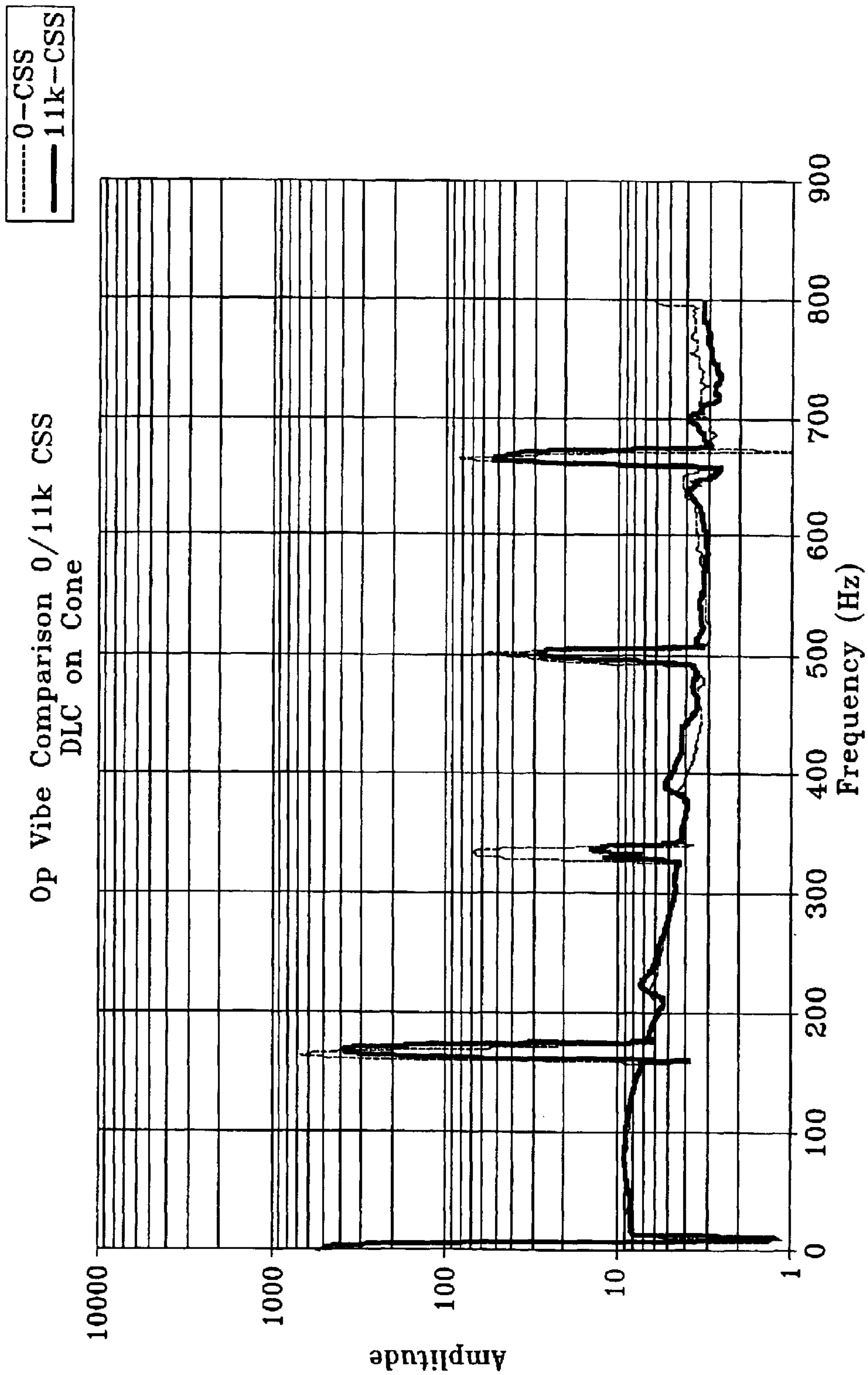
FIG. 8 is a graphical illustration of improved dynamic performance with a DLC coating, as in an embodiment of the invention.

FIG. 8 shows a graphical representation of an operational vibration comparison of a contact stop/start (CSS) in which a DLC coating is utilized on a stationary component or a rotational component, as provided by an embodiment of the present invention. Similar to FIG. 7, measurements were taken of amplitude and frequency at zero CSS (thin dotted line) and at 11,000 CSS (thick solid line). As can be observed in comparing the 0 CSS line with the 11,000 CSS line, dynamic performance does not degrade in the case when utilizing a DLC coating as it does in the case when not utilizing a DLC coating on a bearing surface.

As discussed above, dynamic performance is a function of the bearing gap. Gap design tolerance is achieved by providing, as discussed above in an embodiment of the invention, a bearing gap within specified dimensions (tolerance). Gap design tolerance is further achieved by providing, as discussed above in an embodiment of the invention, a rotatable and stationary pair (i.e. shaft and sleeve, or a shaft and cone) that ensures negligible wear or no wear on the contacting bearing surfaces.

As discussed herein, negligible wear is defined as wear that has no clearly observable effect, given testing on the dynamic performance of the motor. An example of dynamic performance testing and a showing of negligible wear is shown in FIG. 8. As understood by those skilled in the art, wear acceptability is drive dependent. In some drives the acceptable wear is a few micrograms, and in other drives the acceptable wear is 10 to 100 micrograms. Also, the quantity of oil supplied to the bearing affects the wear acceptability.

An example is next presented of an effect that an embodiment of the present invention has on material wear rates in a spindle motor. A decrease in wear rate results for a steel material wear couple in a spindle motor, when utilizing DLC as in an embodiment of the present invention. In this example, the wear rate decreases by a factor of about 11.4, when utilizing DLC as described above. Specifically, steels SS 303 and DHS 1 exhibit wear rates of $2.1\times10^{-5}$ (micro-grams)/(newton-mm) when utilized in a spindle motor as a wear couple. Whereas, steels SS 303 (with DLC coating) and DHS1 exhibit wear rates of $1.84\times10^{-6}$ (micro-grams)/(newton-mm) when utilized in a spindle motor as a wear couple.

Having disclosed exemplary embodiments, modifications and variations may be made to the disclosed embodiments while remaining within the spirit and scope of the invention as defined by the appended claims. For example, in an embodiment, the present invention can be utilized in a disc drive data storage device having a hydrodynamic or hydrostatic (hydro) bearing spindle.

Further, although the present invention has been described with reference to coatings for disc drive storage systems and spindle motor assemblies, those skilled in the art will recognize that features of the discussion and claims may be practiced with other components, including other systems employing tight bearing gaps within a specified tolerance, particularly technologies where the dynamic performance of the hydrodynamic motor is a function of the gap.

We claim:

1. A disc drive storage system comprising:

a housing having a central axis;

a stationary component that is fixed with respect to the housing and coaxial with the central axis;

a rotatable component that is rotatable about the central axis with respect to the stationary component;

a data storage disc attached to and coaxial with the rotatable component;

an actuator supporting a head proximate to the data storage disc for communicating with the disc; and a hydro bearing defining a gap and interconnecting the stationary component and the rotatable component and having surfaces separated by a lubricant, wherein a surface of at least one of the stationary component and the rotatable component has a tapered surface coating.

2. The disc drive storage system as in claim 1, wherein the stationary component comprises a shaft and the rotatable component comprises at least one of a sleeve and a hub.

3. The disc drive storage system as in claim 2, wherein the sleeve is a conical sleeve.

4. The disc drive storage system as in claim 1, wherein the surface coating is a non-reactive material for meeting gap tolerance design specifications and for achieving good dynamic performance and negligible wear to motor components.

5. The disc drive storage system as in claim 4, wherein the non-reactive material is selected from the group consisting of carbon and diamond like carbon (DLC).

6. The disc drive storage system as in claim 1, wherein the surface coating comprises a first tapered coating on the stationary component and a second tapered coating on the rotatable component, wherein the first tapered coating substantially nullifies the taper of the second tapered coating.

7. The disc drive storage system as in claim 1, wherein the hydro bearing having a coating and defining a gap is a uniform distance between 0.5 microns and 6 microns.

8. The disc drive storage system as in claim 7, wherein the hydro bearing having a coating and defining a gap has a tolerance of 10%, and wherein the coating thickness is in a range of 0.1 microns to 5.0 microns.

9. The disc drive storage system as in claim 1, wherein the hydro bearing having a coating and defining a gap has a variable distance between 0.5 microns and 6 microns.

10. The disc drive storage system as in claim 1, further comprising:

a stator that is fixed with respect to the housing; and a rotor supported by the rotatable component and magnetically coupled to the stator.

11. A spindle motor comprising:

a housing having a central axis;

a stationary component that is fixed with respect to the housing and coaxial with the central axis;

a rotatable component that is rotatable about the central axis with respect to the stationary component; and a hydro bearing defining a gap and interconnecting the stationary component and the rotatable component and having surfaces separated by a lubricant, wherein a surface of at least one of the stationary component and the rotatable component has a tapered surface coating.

12. The spindle motor as in claim 11, wherein the stationary component comprises a shaft and the rotatable component comprises at least one of a sleeve and a hub.

13. The spindle motor as in claim 12, wherein the sleeve is a conical sleeve.

14. The spindle motor as in claim 11, wherein the surface coating is a non-reactive material for meeting gap tolerance design specifications and for achieving good dynamic performance and negligible wear to motor components.

15. The spindle motor as in claim 14, wherein the non-reactive material is selected from the group consisting of carbon and diamond like carbon (DLC).

16. The spindle motor as in claim 11, wherein the surface coating comprises a first tapered coating on the stationary component and a second tapered coating on the rotatable component, and wherein the first tapered coating substantially nullifies the taper of the second tapered coating.

17. The spindle motor as in claim 11, wherein the hydro bearing having a coating and defining a gap is a uniform distance between 0.5 microns and 6 microns.

18. The spindle motor as in claim 17, wherein the hydro bearing having a coating and defining a gap has a tolerance of 10%, and wherein the coating thickness is in a range of 0.1 microns to 5.0 microns.

19. The spindle motor as in claim 11, wherein the hydro bearing having a coating and defining a gap has a variable distance between 0.5 microns and 6 microns.

20. The spindle motor as in claim 11, further comprising:

a stator that is fixed with respect to the housing; and a rotor supported by the rotatable component and magnetically coupled to the stator.

21. In a spindle motor comprising a housing having a central axis, a stationary component that is fixed with respect to the housing and coaxial with the central axis, a rotatable component that is rotatable about the central axis with respect to the stationary component, and a hydro bearing defining a gap and interconnecting the stationary component and the rotatable component and having surfaces separated by a lubricant, a method of achieving good dynamic performance and negligible wear to motor components comprising applying a tapered coating to a surface of at least one of the stationary component and the rotatable component.

22. The method as in claim 21, wherein coating a surface comprises sputtering a surface of at least one of a sleeve and a hub.

23. The method as in claim 22, wherein sputtering a surface comprises utilizing physical vapor deposition (PVD).

24. The method as in claim 21, wherein coating a surface comprises sputtering a surface of at least one of the stationary component and the rotatable component, and wherein the hydro bearing having a coating defines a uniform gap between 0.5 microns and 6 microns.

25. The method as in claim 21, wherein coating a surface comprises sputtering with a non-reactive material selected from the group consisting of carbon and diamond like carbon (DLC).

26. The method as in claim 21, wherein the stationary component and the rotatable component function in a predetermined orientation;

wherein coating a surface comprises sputtering particles from a target onto the stationary component from a first direction relative to the predetermined orientation, and subsequently sputtering particles onto the rotatable component from a second direction relative to the predetermined orientation;

wherein the first direction is substantially 180 degrees with respect to the second direction; and wherein a taper coating on the stationary component substantially nullifies a taper coating on the rotatable component.

27. The method as in claim 21, further comprising varying the aspect ratio of a female bearing motor part to adjust the thickness gradient of the coating.

28. The method as in claim 21, wherein coating a surface comprises sputtering a surface of a conical sleeve.

* * * * *